Nov. 7, 1950     R. G. LE TOURNEAU     2,528,836
ELECTRIC MOTOR-DRIVEN POWER UNIT
Filed Oct. 27, 1947     4 Sheets-Sheet 1
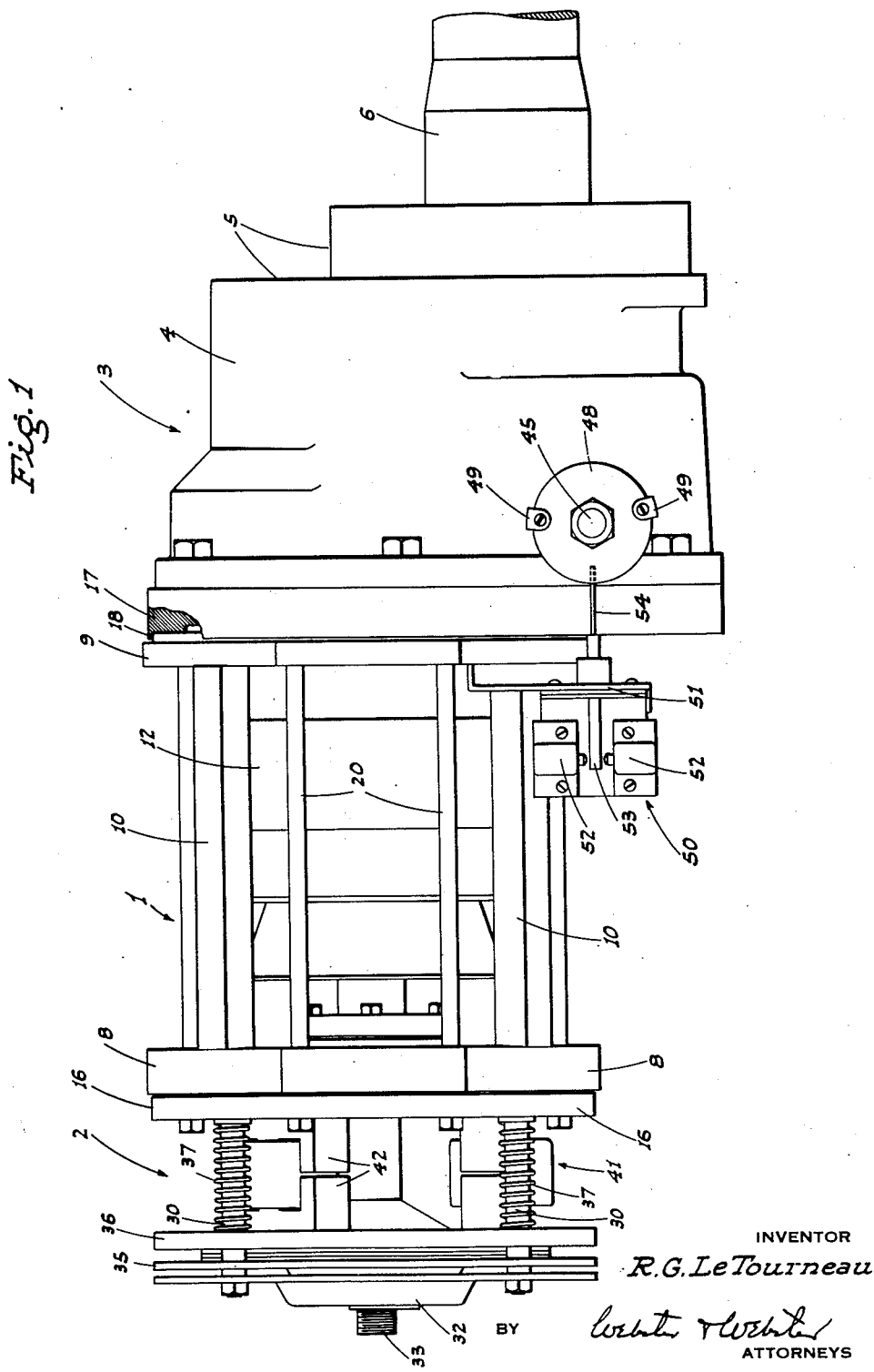
INVENTOR
R.G. LeTourneau
BY
ATTORNEYS

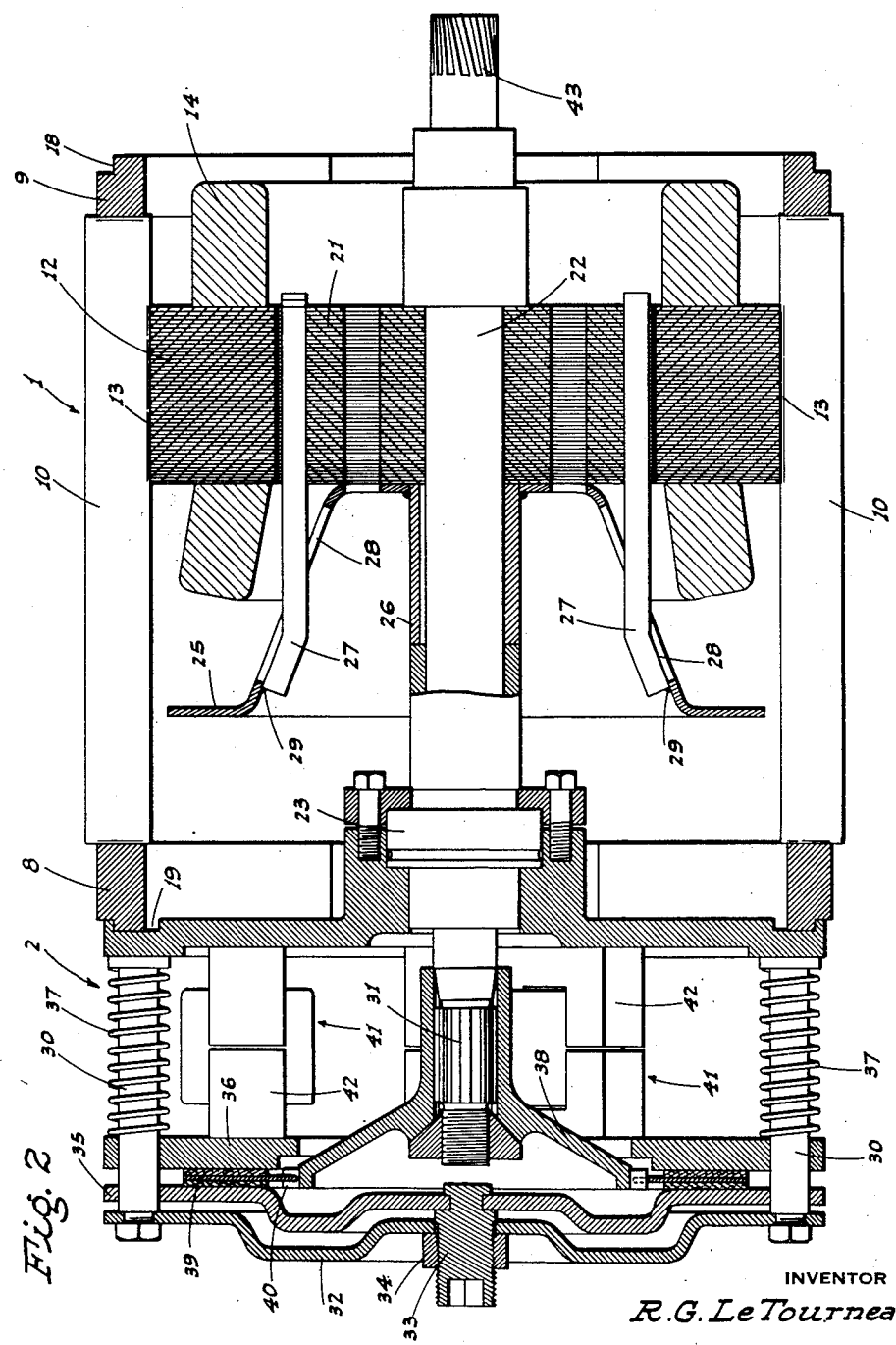

Nov. 7, 1950     R. G. LE TOURNEAU     2,528,836
ELECTRIC MOTOR-DRIVEN POWER UNIT
Filed Oct. 27, 1947     4 Sheets-Sheet 3
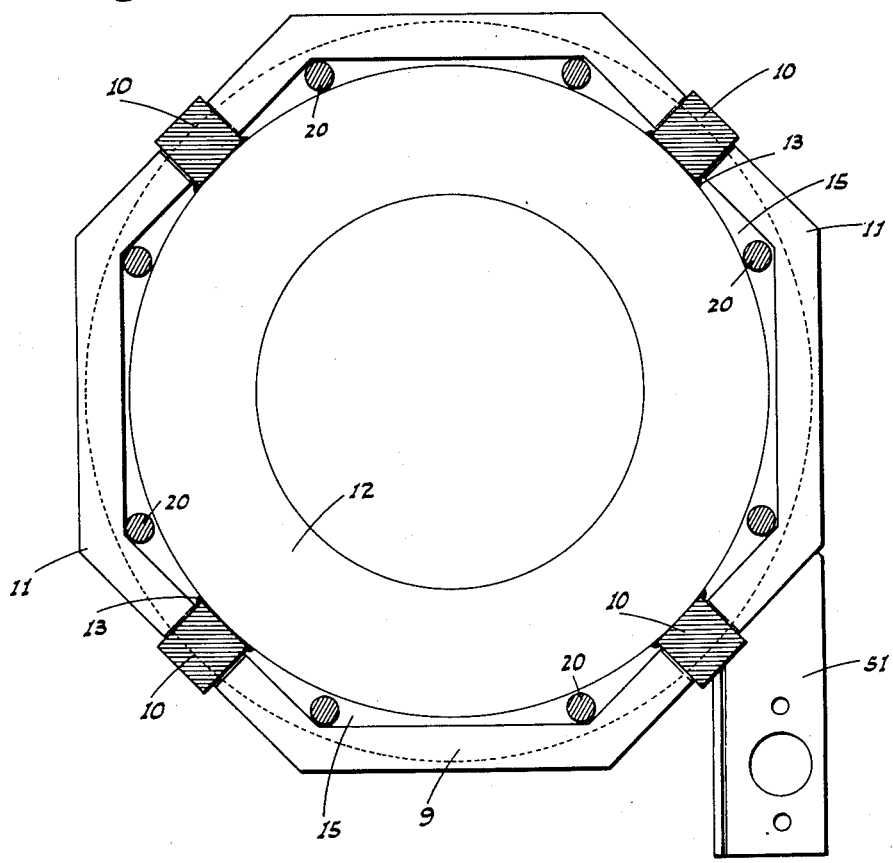
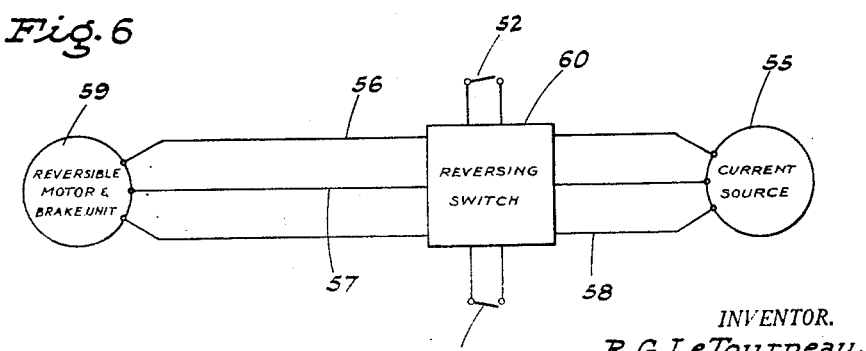
INVENTOR.
R. G. LeTourneau
BY
ATTYS Nov. 7, 1950     R. G. LE TOURNEAU     2,528,836
ELECTRIC MOTOR-DRIVEN POWER UNIT
Filed Oct. 27, 1947     4 Sheets-Sheet 4
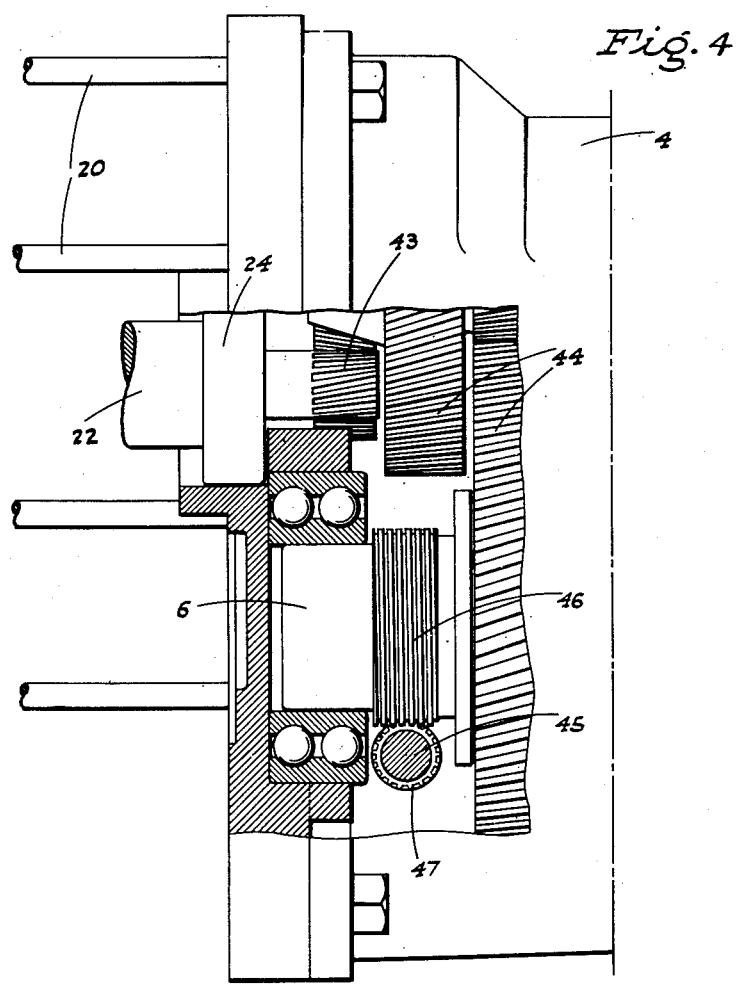
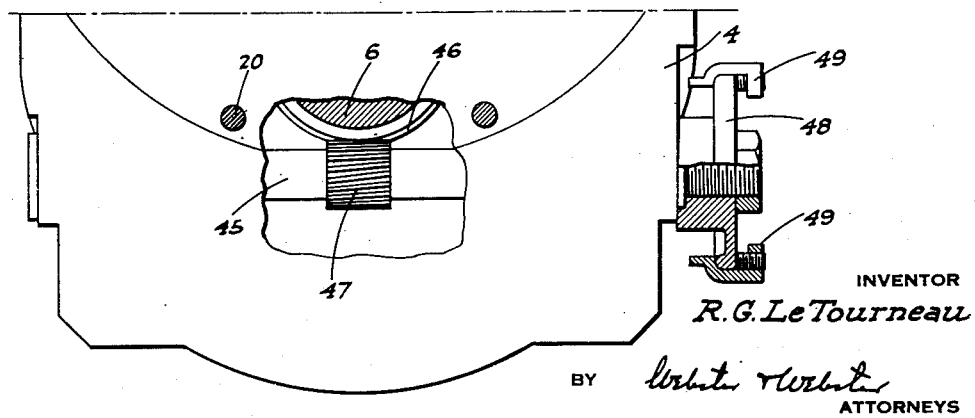
INVENTOR
R. G. Le Tourneau
BY
ATTORNEYS

UNITED STATES PATENT OFFICE 2,528,836

ELECTRIC MOTOR-DRIVEN POWER UNIT

Robert G. Le Tourneau, Longview, Tex., assignor to R. G. Le Tourneau, Inc., Stockton, Calif., a corporation of California Application October 27, 1947, Serial No. 782,379

1 Claim. (Cl. 172—36)

The present invention has for one object the provision of an electric motor driven power unit of novel construction, such power unit, while useful for many purposes, being especially adapted for operating certain movable parts of earth working and construction equipment.

Another object of the invention is to provide a power unit comprising, in novel assembly, an electric motor, a reduction gear box at one end of the motor, and a brake assembly for the motor at its opposite end; such unit being rugged and compact, and adapted to be readily mounted for use.

An additional object of this invention is to provide a power unit, as above, wherein the motor and its frame are of a novel construction, which assures of effective heat dispersion and consequent protection against overheating.

A further object of the invention is to provide a power unit, as in the preceding paragraph, in which the motor frame includes a cage of unique, open or skeleton design secured at opposite ends in engagement with adjacent end walls of the brake assembly and reduction gear box, whereby to complete such frame and also mount the reduction gear box and brake assembly rigidly with the motor.

It is also an object to incorporate in the electric motor, the reduction gear box, and the brake assembly novel features of design which all lend to the production of a smooth operating, high power, and quick starting and stopping device for actuating the working parts of an implement, for example, in an effective and satisfactory manner.

A still further object is the inclusion, with the reduction gear box, of a switch control device which provides a practical means of breaking the motor circuit after a predetermined number of revolutions of the output shaft in one direction or the other; this being a very desirable feature, as it automatically limits—to a predetermined and selective variable extent—the motion transmitted by the power unit to a working part.

A further object of the invention is to provide a practical and reliable electric motor-driven power unit, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of the electric motor driven power unit.

Fig. 2 is a fragmentary sectional elevation showing the unitary relationship of the electric motor and brake assembly.

Fig. 3 is an enlarged cross section of the electric motor cage, detached.

Fig. 4 is an enlarged fragmentary elevation, partly in section, illustrating the attachment of the adjacent end of the motor cage to the gear box case, and also illustrating the manner of take-off of the switch control cross shaft.

Fig. 5 is a fragmentary end view, partly broken away and partly in section, showing the switch control, cross shaft, and the parts driven thereby, on the gear reduction box.

Fig. 6 is a simplified diagram showing the manner of switch control of the electric motor and brake unit.

Referring now more particularly to the characters of reference on the drawings, the power unit comprises generally an electric motor 1 having a brake assembly 2 mounted at one end, and a reduction gear box 3 at the other end, to provide a compact device for operating movable working parts, as for example on an earth working or construction implement.

The reduction gear box 3 includes a case 4, shouldered, as at 5, to facilitate attachment of the device to a fixed support; there being an output shaft 6 leading from the case 4 for driving connection with such working part. For example, on an earth working scraper the output shaft 6 may be fitted with a drum from which a cable leads to a movable instrumentality of the scraper.

The electric motor 1, which is of reversible, high torque induction type, comprises a frame including a cage, indicated generally at 7. This cage 7 is of novel, open or skeleton construction, and is made up of a pair of non-circular, symmetrically multi-sided end rings 8 and 9; such rings here being shown as octagonal, with the several sides thereof being straight.

Connector bars 10 are secured to, and extend between, the end rings 8 and 9 at equally spaced points; said connector bars being disposed centrally between adjacent corners 11 of said rings.

A laminated plate stator 12 is disposed within the motor cage 7 and is welded, as at 13, to the connector bars 10; such stator including stator windings 14 projecting laterally on opposite sides.

As the stator 12 is circular, gaps 15 are left between the corners 11 of the octagonal rings 8 and 9, for the purpose hereinafter described.

The motor frame, which includes the cage 7, is completed by securing the end rings 8 and 9 to adjacent end walls 16 and 17 of the brake assembly 2 and reduction gear box 3; said end rings being annularly shouldered, as for example at 18, and cooperatively engaging in matching annular seats 19 in said end walls 16 and 17 for the accomplishment of proper location of said cage 7.

Longitudinal tie bolts 20 extend through the motor cage 7 and secure, at opposite ends, to the end walls 16 and 17, whereby to positively and rigidly couple said parts; the rods passing through the gaps 15 inwardly of the rings 8 and 9, but outwardly of the stator 12; this arrangement, together with the described annular shoulders 18 and matching annular seat 19, assuring a rigid assembly. In this manner a simplified, yet effective and open, frame is provided for the electric motor.

The motor includes, in cooperation with the frame-mounted stator 12, a laminated plate rotor 21 fixed on a motor shaft 22, said shaft being carried, at opposite ends, in bearings 23 and 24. The bearing 23 is carried on the end wall 16 of the brake assembly, while the bearing 24 is carried on the end wall 17 of the gear reduction box. At one end of the laminated plate rotor 21 the latter carries a heat dissipating end bell 25, enlarging in diameter axially outwardly from the rotor, and fixed therewith by means including a sleeve 26 keyed on the motor shaft 22. This heat dissipating end bell 25 is connected in electrical relation to the laminated plate rotor 21 by a multiplicity of longitudinal, circumferentially spaced conductor bars 27 which lead from the rotor 21 through ports 28 in said end bell. At their outer ends the conductor bars 27 are secured by brazing or the like, as at 29, to an outer portion of said end bell. The high current induced in the rotor 21 causes heating of the bars 27 and end bell 25, by resistance thereof during operation of the motor, and as the motor frame is open or skeleton type, heat may readily dissipate from said end bell out of the motor without over-heating or damage to its parts. This is a very advantageous feature of the invention.

The brake assembly 2, which includes the end wall 16, comprises the following:

A plurality of fixed longitudinal spindles 30 are secured on, and project outwardly from, the end wall 16 in circumferentially spaced relation on a circle about the motor shaft 22, which projects into the brake assembly as a splined portion 31. A circular end head 32 is fixed on the outer end of the spindles 30 and carries a central adjustment screw 33 threaded through a nut 34 on said head. At its inner end the adjustment screw 33 is attached, in relatively rotatable but axially immovable relation, centrally to an outer brake disc 35, which is circular and provided with holes through which the spindles 30 relatively slidably project. The outer brake disc 35 is thus mounted for axial adjustment by the screw 33. An inner brake disc 36 faces the outer brake disc 35, and likewise has the spindles 30 projecting therethrough in relatively slidable relation; i. e. the inner brake disc 36 is slidable axially of the device on said spindles. Compression springs 37 on the spindles 30 normally urge the inner brake disc 36 toward the outer brake disc 35.

A rotary carrier 38 is secured to the splined portion 31 of the motor shaft, and is provided with an intermediate brake disc 39, lined on opposite sides, disposed between the outer brake disc 35 and the inner brake disc 36.

With the described arrangement, the compression springs 37 normally cause clamping engagement of the intermediate brake disc 39 between the outer and inner brake discs 35 and 36; the intermediate brake disc 39 being splined to the rotary carrier 38, as at 40, so as to permit such intermediate brake disc to float axially for proper engagement between the discs 35 and 36. As said brake discs 35 and 36 cannot rotate, the intermediate brake disc 39 and the motor shaft 22 are normally held or braked against rotation.

A plurality of electro-magnets, indicated generally at 41, are mounted between the end wall 16 and inner brake disc 36; being attached to said wall and including a movable armature 42 attached to said inner brake disc 36. When the electro-magnets 41 are deenergized, the springs 37 set the brake assembly, as previously described, but upon energization of said magnets the armatures 42 are snapped in a direction towards the end wall 16, relieving the inner brake disc 36 from the intermediate brake disc 39, whereupon the latter is free to rotate. The brake assembly is thus spring-engaged, but electro-released. The central adjustment screw 33 is provided for the purpose of adjusting the outer brake disc 35, which in turn effects adjustment of the armatures 42; the proper setting of the latter being essential to correct functioning of the brake assembly.

At the end opposite the above described brake assembly 2, the power unit includes the reduction gear box 3 whose case in indicated at 4. The motor shaft 22 projects into the reduction gear box 3, and includes a pinion 43 driving a reduction gear train, indicated generally at 44, which gear train in turn drives the output shaft 6.

The following switch control mechanism is provided in order to break the energizing circuit for the reversible electric motor 1 after a predetermined number of revolutions in one direction or the other of the output shaft 6:

A cross shaft 45 is journaled in the case 4 of the gear box 3 directly below the output shaft 6; the latter having a worm 46 engaging in driving relation with a worm pinion 47 on said cross shaft 45. The cross shaft 45 extends out of the case 4 at one side thereof, and is there fitted with a rotary disc 48 having a pair of circumferentially adjustable lugs 49 secured to the periphery thereof.

A double snap switch, indicated generally at 50, is mounted adjacent the rotary disc 48 on a bracket 51 on the motor cage 7. The double snap switch 50 includes a pair of opposed push button switches 52 having a trigger 53 extending therebetween and swingable, in one direction or the other, to open the corresponding one of said switches 52. At an outer end thereof the trigger 53 includes an extension in the form of a trigger wire 54 which projects, generally radially of the rotary disc 48, into the path of the adjustable lugs 49. The lugs 49 are set on the rotary disc 48 so that after a predetermined number of revolutions of the output shaft 6, and resultant proportionate rotation of the cross shaft 45, one or the other of the lugs 49 engages the trigger wire 54 so as to swing the trigger 53 in a direction to open a predetermined one or the other of the switches 52.

In Fig. 6 there is illustrated diagrammatically a simplified reversing circuit with which the described power unit may be employed; such circuit including a current source 55 and three leads 56, 57, and 58 extending to electrical connection with the reversible motor and brake unit, indicated in the circuit at 59.

The reversible motor 1, and the electro-released brake assembly, are wired in parallel relative to the circuit so that when the same is closed to cause rotation of the motor in one direction or the other, current is simultaneously supplied, preferably by a single-phase sub-circuit, within the unit, to the electro-magnets 41 to then release the brakes. Conversely, when the circuit is opened, the electro-magnets are deenergized and the brake assembly 2 is spring engaged, immediately stopping rotation of the motor shaft.

The reversing circuit includes a reversing switch 60 therein; the common lead of the circuit being 57, while the reversing leads are 56 and 58, respectively. The switches 52 are connected in circuit-breaking relation to opposite sides of the circuit of the reversing switch so that when the described switch control mechanism actuates the trigger 53 to open one or the other of the switches 52, the corresponding side of the reversing circuit is broken and the motor stops.

The switches 52 are spring-closed, so that upon reverse of the motor—after a circuit break by the switch control mechanism—the trigger 53 is relieved and permits closing of the switch 52 which broke the circuit.

The described power unit provides a rugged and compact device for the power actuation of working parts; the characteristic features of the device being the novel open frame, motor structure wherein heat dissipation is accomplished in an effective manner; the unique brake assembly associated with the motor; and the control mechanism driven internally from the gear box to operate the double-acting switch which limits rotation of the reversible motor in one direction or the other.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

In an electric motor power unit, a pair of non-circular multisided end rings, circumferentially spaced connector bars rigidly secured to and extending between the end rings, said bars being disposed substantially centrally between the ends of the sides of the ring to which they are connected, a circular stator rigidly fixed to the inner sides of the connector bars, a pair of end walls provided with annular seats, the end rings being provided with shoulders matchingly fitting the seats in the end walls, tie bolts mounted through and extending between the end walls at points adjacent the angles formed between the adjacent ends of the inner faces of the side walls of the end rings, such tie bolts being effective to secure the end walls, end rings, connector bars and stator together as a rigid unit, a rotor turnably disposed within the stator, a shaft on the rotor journaled in the end walls, and a heat dissipating element fixed to and projecting beyond one end of the rotor and rotatable therewith.

ROBERT G. LE TOURNEAU.

REFERENCES CITED

The following references are of record in the file of this patent:

UNITED STATES PATENTS

| Number | Name | Date |
| --- | --- | --- |
| Re. 18,834 | Ward | May 23, 1933 |
| 920,798 | Wiard | May 4, 1909 |
| 1,194,232 | Raymond | Aug. 8, 1916 |
| 1,898,753 | Wente | Feb. 21, 1933 |
| 1,932,907 | Howe | Oct. 31, 1933 |

FOREIGN PATENTS

| Number | Country | Date |
| --- | --- | --- |
| 84,544 | Sweden | Aug. 8, 1935 |
| 612,235 | Germany | Apr. 16, 1935 |